(12) United States Patent
Macauda

(10) Patent No.: US 12,547,157 B2
(45) Date of Patent: Feb. 10, 2026

(54) STATE INFORMATION HANDLING IN A PROCESS CONTROL SYSTEM

(71) Applicant: ABB Schweiz AG, Baden (CH)

(72) Inventor: Andrea Macauda, Genoa (IT)

(73) Assignee: ABB Schweiz AG, Baden (CH)

( * ) Notice: Subject to any disclaimer, the term of this patent is extended or adjusted under 35 U.S.C. 154(b) by 592 days.

(21) Appl. No.: 17/930,309

(22) Filed: Sep. 7, 2022

(65) Prior Publication Data

US 2023/0080182 A1 Mar. 16, 2023

(30) Foreign Application Priority Data

Sep. 13, 2021 (EP) ..................................... 21196370

(51) Int. Cl.
*G05B 19/418* (2006.01)

(52) U.S. Cl.
CPC ... *G05B 19/41835* (2013.01); *G05B 19/4185* (2013.01); *G05B 2219/23085* (2013.01); *G05B 2219/23231* (2013.01)

(58) Field of Classification Search
CPC .......... G05B 19/41835; G05B 19/4185; G05B 2219/23085; G05B 2219/23231; G05B 2219/23258
USPC ........................................................ 700/106
See application file for complete search history.

(56) References Cited

U.S. PATENT DOCUMENTS

| 2009/0099668 A1 | 4/2009 | Lehman et al. | |
| 2011/0144777 A1* | 6/2011 | Firkins ............... | G05B 23/0272 700/83 |
| 2014/0282257 A1* | 9/2014 | Nixon .................... | G05B 15/02 715/835 |
| 2015/0281649 A1 | 10/2015 | Ehmann et al. | |
| 2016/0132046 A1* | 5/2016 | Beoughter ............ | G06F 16/248 700/17 |
| 2019/0011901 A1 | 1/2019 | Wu et al. | |

(Continued)

FOREIGN PATENT DOCUMENTS

| DE | 102014103397 A1 | 9/2014 |
| GB | 2491033 A | 11/2012 |

(Continued)

OTHER PUBLICATIONS

European Search Report; Application No. EP21196370. 7; Completed: Feb. 7, 2022; Mailed: Feb. 16, 2022; 7 Pages.

*Primary Examiner* — Jigneshkumar C Patel
(74) *Attorney, Agent, or Firm* — Whitmyer IP Group LLC

(57) ABSTRACT

A state information handling server, a process control system including such a state information handling server as well as to a method, computer program and computer program product for handling state information. The state information handling server obtains state information from user terminals of users in the process control system, where the state information of at least two users includes information about user operations in relation to objects in a process control screen, inspects the state information with regard to objects in the process control screen, which inspecting includes determining, for each user, if the corresponding user targets an object in the process control screen, and performs a user informing activity if objects in the process control screen that at least two users have targeted is the same or are linked.

10 Claims, 5 Drawing Sheets

(56) References Cited

U.S. PATENT DOCUMENTS

2020/0125068 A1 4/2020 Trounson, III
2020/0326801 A1 10/2020 Nixon et al.

FOREIGN PATENT DOCUMENTS

GB 2513455 A 10/2014
WO 2018232234 A1 12/2018

* cited by examiner

STATE INFORMATION HANDLING IN A PROCESS CONTROL SYSTEM

TECHNICAL FIELD

The invention relates to the handling of state information in a process control system. More particularly, the invention relates to a state information handling server, a process control system comprising such a state information handling server as well as to a method computer program and computer program product for handling state information in a process control system.

BACKGROUND

An industrial process being controlled in a process control system can be monitored by operators via corresponding workstations. During such monitoring it may be of interest for an operator of the process control system to be able to view the operations made by other operators on his or her workstation. This may for instance be of interest if the operators are to collaborate with each other.

Collaboration is discussed in US 2020/0326801. Here a control room enables a secure collaboration session to be established between UI devices, where the control room is made up of the UI devices and a server. The collaboration is based on the transfer of state information between the UI devices as well as from the UI devices to the server, where state information may include information relating to the user or operator interacting with the UI device, the applications, programs, routines, or modules executing with respect to the UI device. The server may also track the state of operation for each UI device by monitoring the execution of routines at the server and monitoring the data received from and transmitted to each of the UI devices.

State information concerning user operations is thus sent to the server and user operations can then be presented to all the different operators if there is an ongoing collaboration session.

However, it may be of interest to use the state information in a more intelligent and dynamic way than only being used for presenting user operations in an ongoing collaboration session.

There is thus a need for an improvement with regard to the use of state information.

SUMMARY

One object of the invention is therefore to improve the use of state information in a process control system.

This object is according to a first aspect achieved by a state information handling server for a process control system, the state information handling server comprising a processor configured to:
  obtain state information from user terminals of users in the process control system, the state information of at least two users comprising information about user operations in relation to objects in a process control screen,
  inspect the state information with regard to objects in the process control screen, which inspecting comprises determining, for each user, if the corresponding user targets an object in the process control screen, and
  perform a user informing activity if objects in the process control screen that at least two users have targeted is the same or are linked.

The object is according to a second aspect achieved through a process control system comprising a state information handling server according to the first aspect.

The object is according to a third aspect achieved through a method for handling state information in a process control system, the method being performed by a state information handling server and comprising:
  obtaining state information from user terminals of users in the process control system, the state information of at least one two users comprising information about user operations in relation to objects in a process control screen,
  inspecting the state information with regard to objects in the process control screen, which inspecting comprises determining, for each user, if the corresponding user targets an object in the process control screen, and
  performing a user informing activity if objects in the process control screen that at least two users have targeted is the same or are linked.

The object is according to a fourth aspect further achieved through a computer program for handling state information in a process control system, the computer program comprising computer program code which when run in a processor of a state information handling server, causes the state information handling server to:
  obtain state information from user terminals of users in the process control system, the state information of at least two users comprising information about user operations in relation to objects in a process control screen,
  inspect the state information with regard to objects in the process control screen, which inspecting comprises determining, for each user, if the corresponding user targets an object in the process control screen, and
  perform a user informing activity if objects in the process control screen that at least two users have targeted is the same or are linked.

The object is according to a fifth aspect further achieved through a computer program product for handling state information in a process control system, the computer program product comprising a data carrier with the computer program with computer program code according to the fourth aspect.

The user informing activity is thus performed if an object in the process control screen targeted by a first user is the same as an object in the process control screen targeted by a second user or if the objects are linked.

The process control screen may be a process control flow screen. A process control flow screen may be a screen of objects representing process control devices, where a process control device may be a device in a process flow of the industrial process being controlled by the process control system.

The objects may be graphical objects in the screens and the user operations may be user operations made in screens being provided for display by the user terminals.

The determining that a user targets an object in the process control screen may comprise determining that the user has selected, is about to select or is interested in the object in the process control screen.

The state information related to an object in the process control screen may comprise user operations made in the process control screen.

The state information for at least one user may comprise information about movements of pointers in the process control screen.

The determining that a user targets an object through being about to select it, may then be made if the pointer of the user is moved towards and reaches a minimum distance to the object.

The state information for at least one user may additionally comprise an object that the user has selected in the process control screen.

The determining that the user has targeted an object may then be made if state information indicates that the object has been selected in the process control screen.

The state information related to an object in the process control screen may comprise user operations in another screen associated with an object of the process control screen. The other screen may for instance depict a graph of a physical property of a process control device represented by the object in the process control screen.

The determining that a user is interested in and has targeted the object in the process control screen may then be made if there are user operations in the other screen.

At least one of the targeted objects may represent a process control device. It may additionally represent a process influencing process control device. A process influencing process control device may additionally be a process control device that is used to control the process, i.e. be involved in influencing physical properties of the process, such as influencing pressure, temperature, flow etc.

A process control device may additionally be a property measuring process control device, where the property measuring process control device may measure a physical property of the industrial process.

Targeted process control objects may be linked if the process control devices they represent are present in the same process flow. It is additionally possible that the process control devices that the targeted objects represent are neighbours in the process flow.

The targeted objects may additionally be linked if one of them represents a process influencing process control device located upstream of a process control device represented by the another of them. The process control device represented by the other object may also be a process influencing process control device. Alternatively, it may a property measuring process control device.

It is additionally possible that the performing of a user informing activity is based on the generation of an alarm in the process control system. The performing of the user informing activity may thus be based on the targeting of the same or linked objects and the generation of an alarm.

The obtaining of state information may be continuously made. However, the inspecting of the state information and the determining that objects in the process control screen that at least two users have targeted is the same or are linked may only be made in a local mode. In the local mode a user can only see his or her own user operations.

The user informing activity may comprise warning the users that the objects in the process control screen which at least two users have targeted is the same or are linked. The warning may with advantage be made in the local mode.

Alternatively, the user informing activity may comprise entering a collaboration mode, where the users are presented with user operations in the same screen. It is in this case possible that there is a change from the local mode to the collaboration mode.

In the collaboration mode it is possible that the same screen is a process control screen in which the pointers of at least two users are displayed. It is also possible that selections of all users made in the process control screen are displayed.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

The invention is generally directed towards a process control system and more particularly towards the use of state information of the operations made by users at user terminals of the process control system for performing a user informing activity.

Figure 1:
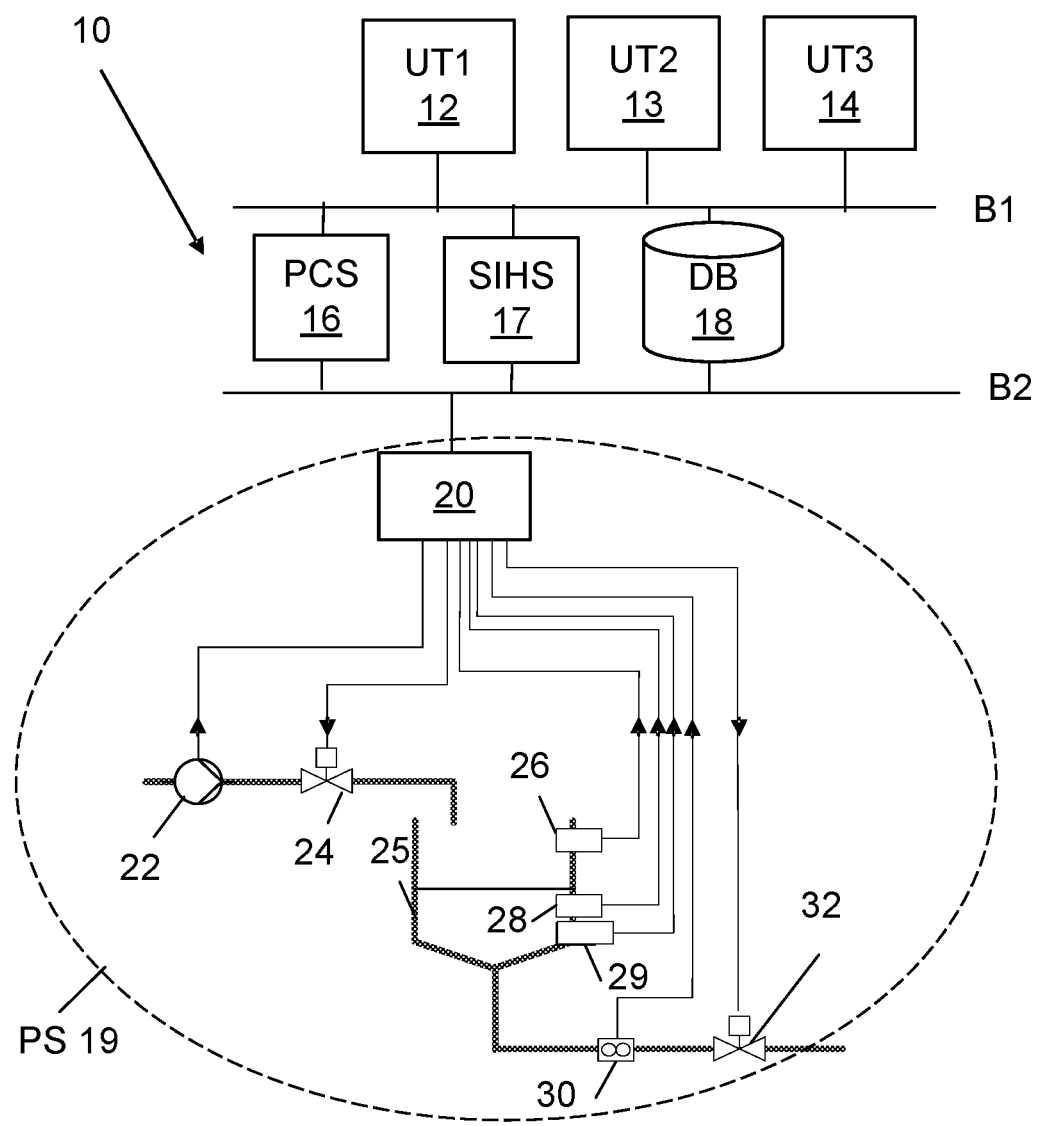
FIG. 1 schematically shows a process control system including a state information handling server and a first, second and third user terminal.

FIG. 1 schematically shows a process control system 10 for controlling an industrial process or perhaps part of an industrial process. Typical processes are electrical power generation, transmission, distribution and supply processes, water purification and distribution processes, oil and gas production and distribution processes, petrochemical, chemical, pharmaceutical and food processes, and pulp and paper production processes. These are just some examples of processes where the system can be applied. There exist countless other processes. Normally there may in such a system be one or more controllers having some local software for controlling one or more pieces of process control equipment. The process control equipment may comprise equipment that influence or measure different properties of the technical process. A piece of process control equipment may for instance be a pump, a motor, a valve, etc. A process, or a part of a process, may be controlled via a server, which then typically communicates with a controller for providing local control. The process may be monitored through an operator terminal or workstation, which communicates with the server. Such a workstation or operator terminal is also a form of user terminal.

In FIG. 1 the system 10 therefore includes a number of user terminals UT1 12, UT2 13 and UT3 14 connected to a first bus B1. There is in this case a first user terminal UT1 12, a second user terminal UT2 13 and a third user terminal UT3 14. There is furthermore a second bus B2 and between the first and second busses B1 and B2 there is connected a process control server PCS 16 with a control function for controlling the process and a database DB 18 with data concerning process control equipment, such as data concerning physical quantities of the process control equipment. There is also a state information handling server SINS 17 connected between the first and the second buses B1 and B2. To the second bus B2 there is furthermore connected a controller 20 (Process Controller or Programmable Logic Controller (PLC)) for providing local control in the system 10.

In the figure there is only provided one controller 20. It should however be realized that there may be several more controllers in the system 10. The controller 20 is connected to one or more pieces of process control equipment. As an example, the controller 20 is shown as being connected to process control equipment in a process section PS 19 for controlling a part of the industrial process, which process section 19 includes a first inlet pipe leading to a tank 25 and a second outlet pipe leaving the tank 25. In the first pipe there is provided a pump 22 that pumps fluid into the first pipe as well as a first valve 24. In the tank 25 there are provided two level sensors 26 and 28 and in the outlet pipe there is provided a flow meter 30 and a second valve 32. There is also a temperature sensor 29 in the tank 25. The pipes, tank, valves, and sensors are examples of process control equipment. The level sensors 26 and 28 measure the physical quantity liquid volume, the temperature sensor measures the physical quantity liquid temperature and the flow meter 30 measures the physical quantity volumetric flow rate of the liquid. The controller 20 may receive control input values from the pump 22, level sensors 26 and 28 and temperature sensor 29 and regulate the liquid level in the tank 25 based on these control input values through controlling the first valve 24. It also receives control input values from the flow meter 30 and temperature sensor 29 and controls the second valve 32 for regulating the output fluid flow. The above-described control is merely an example of one type of control in a process control example. It should be realized that several different other types of control are possible and that several other types of physical quantities can be measured. It is for instance possible to also measure pressure. The above-described process control equipment are therefore also merely examples of process control equipment that can be used. The controller and process control equipment are all examples of process control devices.

Figure 2:
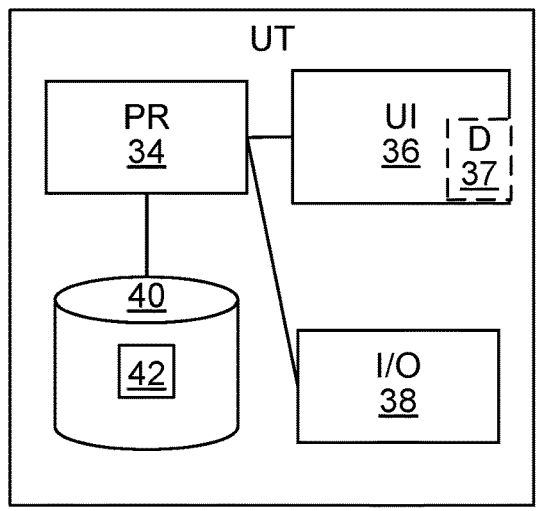
FIG. 2 shows a block schematic of a user terminal.

FIG. 2 schematically shows one realization of a user terminal UT. There is a processor PR 34 and a data storage 40 with computer program instructions 42 that, when executed by the processor 34, implements a state information collecting function. There is also an input/output (I/O) interface 38 for communication with the other entities in the process control system and especially for communicating with the state information handling server 17, the control server 16 and/or the database 18. Finally, there is a user interface UI 36 which comprises a display D 37 for displaying information about the process and the process control system to a user, such as an operator. The display 37 may be a touch screen display allowing the user to input data and commands as well as to move a pointer or to selected objects in different screens. It should be realized that the user interface 36 may also or instead comprise other means of allowing user input, such as a mouse or trackball, a keyboard, or a keypad.

Figure 3:
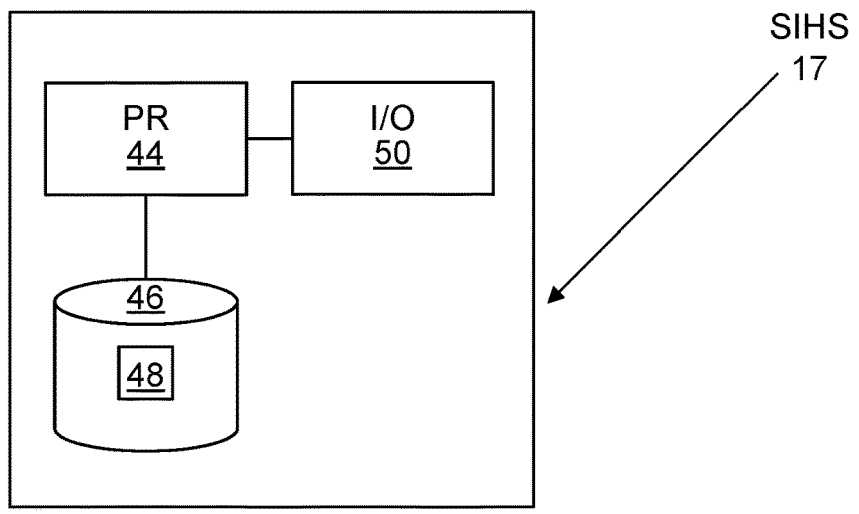
FIG. 3 shows a block schematic of the state information handling server.

FIG. 3 schematically shows one realization of the state information handling server 17. There is a processor 44 and a data storage DS 46 with computer program instructions 48 that, when executed by the processor 44, implements a state information handling function. There is also an input/output (I/O) interface 50 for communication with the user terminals.

The user terminals may display various screens of the process control system, where one type of screen is a process control screen that may depict parts of process control system such as graphical objects representing process control devices, for instance in the form of face plates, which objects may be interconnected. A process control screen or process control flow screen is a screen of objects representing process control devices, where process control devices are devices in a process flow of the industrial process being controlled by the process control system. It should here be realized that it is possible with also other types of display objects in the screen. It is also possible with other types of screens. Other screens may depict data about objects in the process control system such as data about a process control device, like charts or graphs of physical quantities of the process control device.

Figure 4:
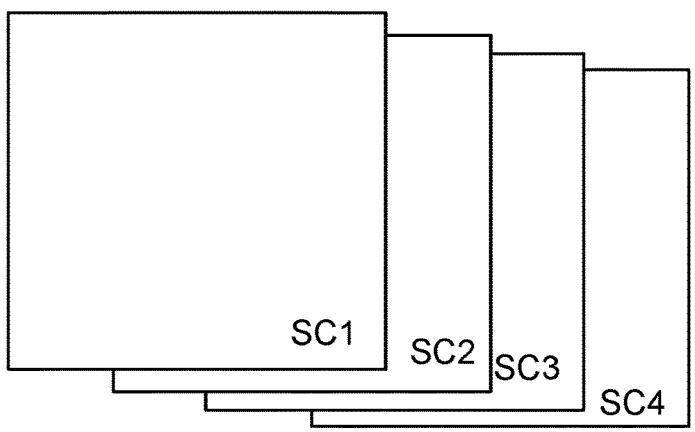
FIG. 4 shows a number of different screens that can be displayed on the user terminals.

As an example, as shown in FIG. 4, there is a first screen SC1, a second screen SC2, a third screen SC3 and a fourth screen SC4. It is here possible that the screens are common screens. They may depict views that are possible to view by all of the users at all of the user terminals 12, 13 and 14, where at least one screen is a process control screen.

Figure 5:
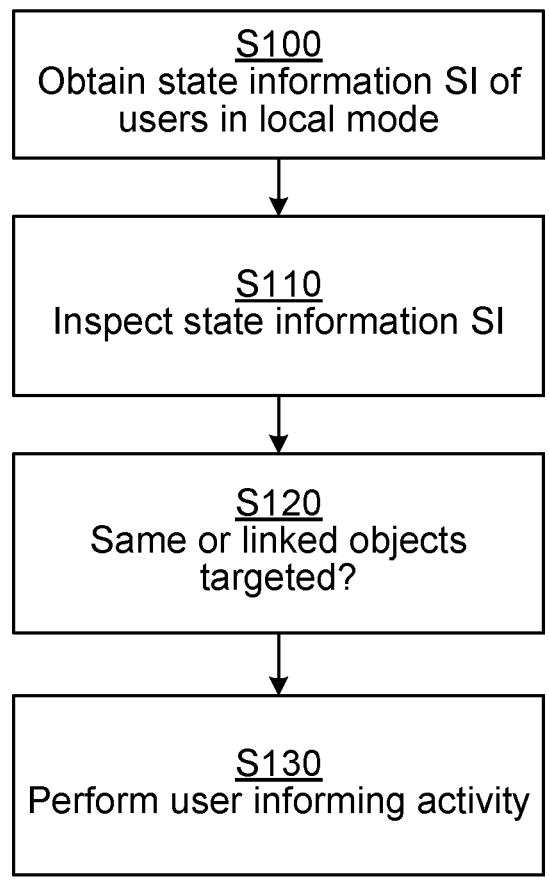
FIG. 5 shows a flow chart of a number of method steps in a method of using state information, which method steps are being performed by a state information handling function in the state information handling server.
Figure 7:
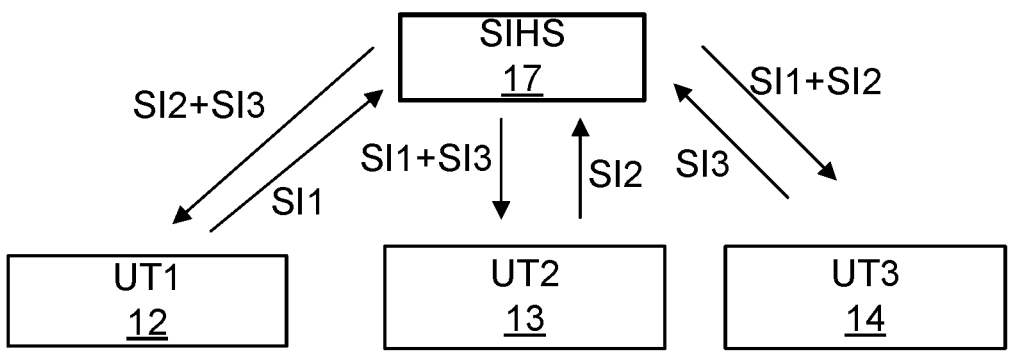
Figure 6:
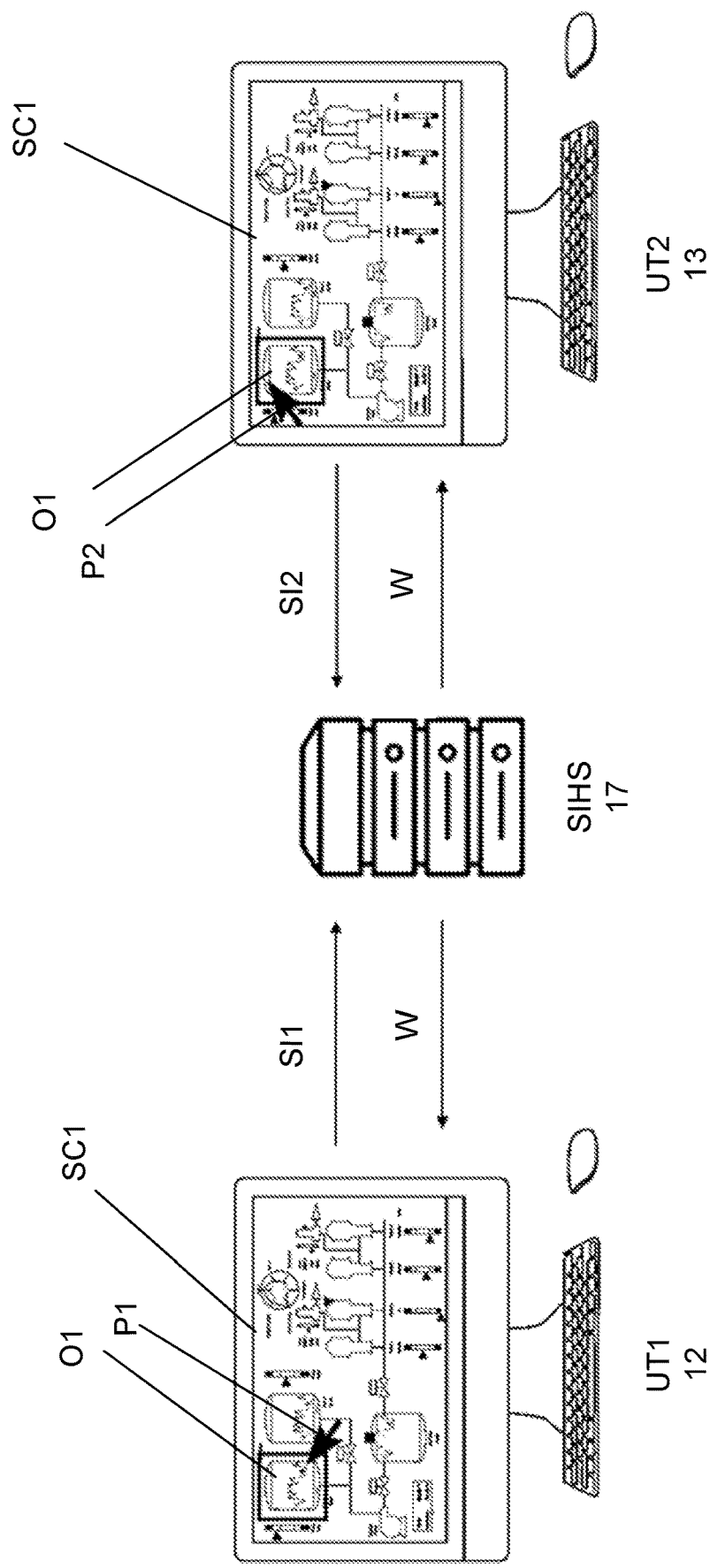
FIG. 6 shows pointers and objects being operated on in a first screen by a first and a second user at the first and the second user terminals as well as the first and second user terminals communicating with the state information handling server, FIG. 7 schematically shows the first, second and third user terminals communicating with the state information handling server.

Now the operation of a method of handling state information will be described with reference being made to FIGS. 5, 6 and 7, where FIG. 5 shows a number of steps in the method of handling state information and being performed by the state information handling function of the state information handling server 17, FIG. 6 shows pointers and objects being operated on in a first screen by a first and a second user at the first and the second user terminals as well as the first and second user terminals communicating with the state information handling server and FIG. 7 schematically shows the first, second and third user terminals communicating with the state information handling server.

Initially the user terminals 12, 13 and 14 are operating in a local mode, in which each user may select among the screens SC1, SC2, SC3 and SC4. A user may then perform operations in the selected screen, such as moving a pointer, cursor or marker and making selections, such as selecting objects or other elements, where an object is a graphical object in such a screen. These operations are also shown on the display of the user terminal used by the user. The user operations are thus user operations made in screens being provided for display by the user terminals. However, in the local mode the showing of the operations is restricted to the operations of the user of the terminal itself. The operations of the other users cannot be seen in the local mode.

An example of this is shown in FIG. 6, where a first user at the first user terminal 12 and a second user at the second user terminal 13 both view the first screen SC1, which first screen SC1 is a process control screen. In a process control screen objects may be used to input data into and obtain data from the industrial process In the example, the first user has moved a first pointer P1 to a first object O1 and selected it and the second user has moved a second pointer P2 to the first object O1 and selected it. The selections are here indicated through squares surrounding the first object O1 in the displays of the first and second user terminals 12 and 13. Although the first and second users have both selected the first object O1, the first user can only see his or her own pointer P1 and selection on the first user terminal 12 and the second user can only see his or her own pointer P2 and selection on the second user terminals 13

The state information collecting function of each user terminal detects the user state of the corresponding user at the user terminal, which user state comprises information about the current screen in which the user operates and the activities of the user in this screen. The activities may comprise the movements of the pointer in the screen, such as the position of the pointer in the screen and information of whether an object or other item is selected or not in the screen. State information SI is then sent to the state information handling function of the state information handling server 17, which sending may be made continuously. In the example of FIG. 6, the state information collecting function of the first user terminal 12 sends first state information SI1 to the state information handling server 17, where the first state information SI1 comprises the position of the first pointer P1 and the selection of the first object O1 in the first screen SC1. In a similar manner the state information collecting function of the second user terminal 13 sends second state information SI2 to the state information handling server 17, where the second state information SI2 comprises the position of the first pointer P1 and the selection of the first object O1 in the first screen SC1.

If information of a selected object is sent, it is also possible that the state information comprises information about what type of object is selected, such as if the object represents a process control device, where a process control device may be a device that influences a property of the technical process or a device that measures a physical property of the industrial process. As an alternative the state information handling function of the state information handling server may have this knowledge about the types of process control devices that the objects represent.

The method may, therefore, as can be seen in FIG. 5, start by the state information handling server obtaining state information SI of the users in the local mode from the different user terminals, S100, which obtaining may be a continuous obtaining of state information. The obtaining may be done through the state information handling server 17 receiving state information from the user terminals about the operations of the users. Moreover, the state information concerning at least two users comprises information about user operations in relation to objects in a process control screen. The state information for at least one user may comprise information about movements of pointers in the process control screen. The state information for at least one user may also comprise an object that the user has selected in the process control screen. Additionally, the state information for at least one user may comprise user operations in another screen associated with an object of the process control screen.

In the example in FIG. 6, the state information SI1 of the first user comprises data about the first pointer P1 and data about the selection of the first object O1 and the state information SI2 of the second user comprises data about the second position P2 and data about the selection of the first object O1, which state information SI1 and SI2 is then sent to the state information handling server 17.

As can be seen in the example of FIG. 7, the first user terminal 12 may send first state information SI1 about the operations of the first user, the second user terminal 13 may send the second state information SI2 about the operations of the second user and the third user terminal 14 may send third state information SI3 about the operations of a third user Thereafter the state information handling function of the state information handling server 17 inspects the state information with regard to objects in the process control screen, S110. The inspection, which is made for each user, may be an inspection of the movement of the pointers, such as if they are moving towards an object in the process control screen. For this reason, the change in position of the pointer over time as well as speed of movement may be inspected. The inspection may also comprise an investigation of if an object is actually selected in the process control screen or if the user is active in another screen that is related to an object in the process control screen.

The inspection of state information about a user may result in that the user is determined to target an object in the process control screen, where a targeting may be made because the user has selected, is about to select or is interested in an object in the process control screen. The inspection of state information is thus made for each user and involves determining if the corresponding user targets an object.

A selection of an object will lead to the object being deemed to be targeted. The determining that the user has targeted an object may thus be made if state information indicates that the object has been selected in the process control screen.

The conclusion that a user is about to select an object may be made based on the position, change of position and/or speed of movement of his or her pointer in the process control screen. A user may be deemed to be about to select an object if the pointer is located within a minimum distance from the object and/or if it is deemed to be moving towards the object perhaps above a certain speed. The determining that a user targets an object through being about to select it, may as an example be made if the pointer of the user is moved towards and reaches a minimum distance to the object in the process control screen.

A user may additionally be deemed to be interested in and target an object in the process control screen if looking at information about the object in another screen. The other screen may for instance depict a graph of a physical property of a process control device represented by an object in the process control screen.

A user that is looking at data about or from the object in a separate screen may thus be deemed to be interested in and target the same object in a screen depicting the process flow. If for instance the third screen SC3 depicts data of the first object O1, a user performing activities in this third screen SC3 would be deemed to be interested in and thus to target the first object O1 in the process control screen SC1.

The inspection may furthermore comprise a comparison of the objects that have been targeted by the different users. There may therefore be an investigation of if the objects in the process control screen that the users have targeted is the same or are linked, S120, where a targeted object is a selected object, an object about to be selected or of interest to the user, where an object to be selected is determined through movements in the process control screen and an object of interest is determined through looking at another screen.

It is possible that the objects have to represent process control devices in order to be considered to be targeted. It is additionally possible that at least one of the targeted objects represents a process control device. Alternatively, it is possible that at least two of the targeted objects represents a process control device. At least one of the targeted objects may additionally represent a process influencing process control device, where a process influencing process control device may be a process control device that is used to control the process, i.e. be involved in influencing physical properties of the process, such as influencing pressure, temperature, flow etc. As an example, it may thereby be a pump, a motor, or a valve etc. However, it may also be a controller. A process control device may additionally be a property measuring process control device that measures a physical property of the industrial process, such as a sensor.

A process control object that is targeted by one user is considered to be linked to another of the objects targeted by another of the users if the objects represent process control devices in the same process flow. In order for the objects to be considered to be linked, it is additionally possible that the devices that they represent are neighbours in the process flow and/or that one of the linked objects represents a process influencing process control device.

The targeted objects may be linked if one of them represents a process influencing process control device located upstream of a process control device represented by the another of them. The process control device represented by the other object may also be a process influencing process control device. Alternatively, it may a property measuring process control device. Put differently, a first object may be linked to a second object if the first object represents a first process control device that influences the control and is located upstream of a second process control device represented by the second object, where the second process control device may not necessarily be a process influencing process control device.

If the objects in the process control screen that at least two users have targeted are the same or linked, then the state information handling function of the state information handling server 17 performs a user informing activity, S130. The user informing activity may be the generation of a warning to the involved users or the starting of a collaboration mode.

It is here also possible that a user informing activity is performed based on the generation of an alarm in the process control system. An alarm may thus be generated in the process control system, which may be displayed in the process control screen SC1 or signalled in another way. It is possible that the user informing activity is performed based on the determining that the same or linked objects are targeted as well as on the generation of an alarm.

The obtaining of state information may, as was mentioned earlier, be continuously made. However, the inspecting of the state information and the determining that objects in the process control screen that at least two users have targeted is the same or are linked may only be made in the local mode in which a user can only see his or her own user operations. Also, the generation of a warning may be made in the local mode.

In the example of FIG. 6, the first user at the first user terminal 12 and the second user at the second user terminal 13 both have selected the first object O1 in the first screen SC1, which object may represent a process influencing process control device. In this case the state information handling function of the state information handling server 17 sends a warning W to both the first and the second user terminal 12 and 13, which warning W may then be presented at the user terminals, for instance visually or audibly. The warning sent to a user may also comprise information about which other user has selected or is deemed to be interested in or operate the same or linked object as well as information about the object of the other user if the objects are linked.

Put differently, the user terminals used by the different users may always be sharing state information with the state information handling server 17. The user terminals may thus send state information to the state information handling server, which is able to elaborate on this information and understand if two or more users are trying to select objects that are the same or linked and may in this case inform all these users that they might enter in a "collision".

The avoiding of such collision may be an important aspect during operation of the process control system, when the users are process control system operators.

The state information handling server 17 knows all the operator's activities and, although operators may care much about each other's activities, the state information handling server 17 could recognize potential collisions between operator's activities and warn them.

These cases have traditionally been managed by the user terminals with interlocks. However, here it would be more efficient because the state information handling server could inform the operators even before they try to access the resource. It can also provide additional information such as which other operator is interested in the object If on the other hand a collaboration mode is started based on the finding that at least two users target the same object or linked objects, then the collaboration mode is automatically started at least for these users, which starting of a collaboration mode also involves starting a collaboration session. There is thus a change from the local mode to the collaboration mode. It is in this case also possible that users for which these conditions are not fulfilled are invited to the collaboration session.

In the collaboration session all participants will be able to see the operations performed by each other. The participating users are presented with user operations in the same screen.

In the collaboration mode it is possible that the same screen is a process control screen in which the pointers of at least two users are displayed. It is also possible that selections of all users made in the process control screen are displayed.

Collaboration is in many instances important for process control system operators.

There might be multiple reasons for a collaboration session:
- Need for support: one operator is asking other operators' opinion on how to proceed with a certain situation
- Avoid collisions: if one operator can see each other's mouse pointer, is aware about the actual activities of colleagues on user terminal and can avoid interfering with their activities Training: beginners may understand from seniors by watching on what they are doing and operating the system The collaboration session may involve the state information handling server making sure that all user terminals involved in the session have all state information of each other. There are a number of ways in which this may be realized.

In the example of FIG. 7, a collaboration session is started for the first second and third users at the first, second and third user terminals 12, 13, 14 and the state information handling server 17 makes sure that a user terminal has all state information through sending the state information that it does not already possess. The state information handling function of the state information handling server thereby sends the first and the third state information SI1 and SI3 to the first user terminal 12, the first and the third state information S1 and S3 to the second user terminal 13 and the first and the second state information SI1 and SI2 to the third user terminal 14. Each user terminal can then display the operations defined in the received state information together with operations of the "own" user and thereby the users can see the operations of each other.

This is possible to complement with the use of a communication link between the collaborators, which link may be a voice or video link that is set up via the state information handling server 17.

As an alternative the collaboration handling server may send the screens with the operations of the state information to the different user terminals.

Figure 8:
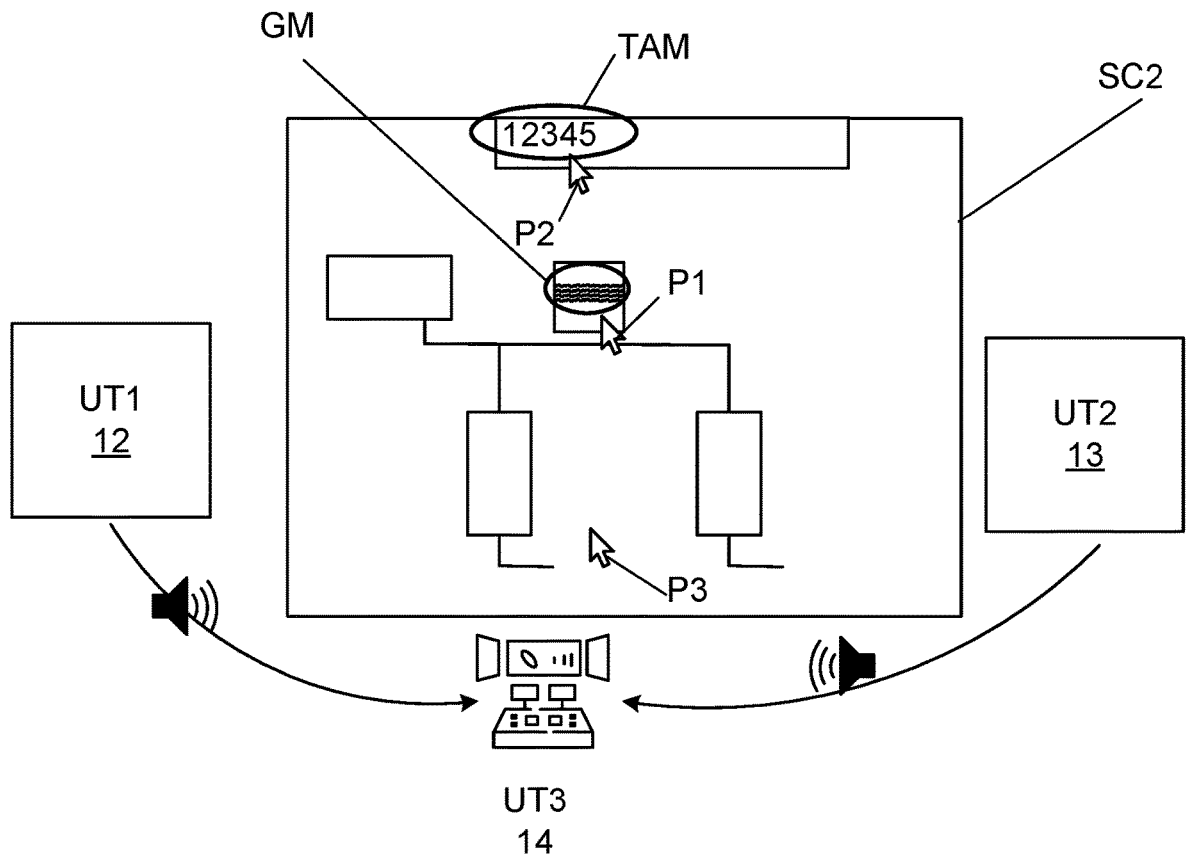
FIG. 8 shows a second screen displayed on the display of the third user terminal together with pointers of the users of the first and second user terminals in a collaboration session.

FIG. 8 shows an example of a collaboration session as seen via the third user terminal 14. In FIG. 8 the first and second pointers P1 and P2 of the first and the second users and selections made by them in a second screen SC2 are shown together with a third pointer P3 of a third user on the display of the third user terminal 14. In the example the second user is entering text in a text entry area, which area is highlighted through a text area marker TAM. The first user in turn looks at process control data graphs, which is highlighted through a graph marker GM. The third user is in turn investigating an object representing a process control device. As the display is the display of the third user terminal 14 of the third user, no marker needs to be used for the selection of the third user.

In case a user is operating in another screen related to one of the objects in the second screen SC2, it is possible that a visual indication may be made about this fact to the other users, for instance using a message window or post-it type of notification.

The provision of a collaboration session in this way allows professionals in the process control system world to collaborate with each other in real-time using a content sharing infrastructure, which is important if the professionals are more and more working in a remote mode and in their home-offices or anyways geographically separated.

When the users are operators, they can visualize in real-time the same content without the need of external infrastructure such as TeamViewer, VNC, etc. and work together on taking decision on Operations matter (e.g., open valve, activate pumps, etc.) by looking at the same screen, visualize colleagues current activities on same process graphics, and communicate with them using the same infrastructure.

Graphical User Interfaces (GUIs) of user terminals in a process control system are made of resources such as graphic symbols, widgets, edit box, text boxes, labels, controls, buttons, etc. The operators interact with the user terminals by reading and inputting information into these resources.

In the collaboration session, all participating operators visualize the same data contained in such resources, since they normally contain values offered by a server that updates in real-time this data.

In the examples given above the users were operators in a process control system. However, it should be realized that the principles described above are applicable also for engineering.

For engineering, the situation is a bit different since normally files are "locked" in order to guarantee consistency.

However, it is still impossible to see what another colleague is actually doing in a certain moment. It may only be possible to see the result of what they did.

Through the provision of a collaboration session Engineering personnel can work together on engineering control logics or process graphics.

It can also be seen that also the generation of a warning is advantageous also in the engineering case as a warning may be generated before an engineer attempts to select a blocked object.

Through the provision of a collaboration session the content of all the user terminal resources may be managed centrally by the state information handling function of the state information handling server that can replicate instantaneously each action performed in each GUI resource in every participating user terminal.

Considering that even user's cursor or mouse pointer can be a GUI resource, users could see even other's user mouse and cursor position in their screen.

Example in Operations Context:
- An operator in a control room would like to ask support to a couple of subject matter expert before taking a decision (e.g., Opening a valve)
- He can call two experts using the state information handling server (that may use some voice communication technology)
- The three colleagues can turn on the collaboration mode in their user terminals and agree to go in the same screen (or some "follow me" button may be hit by the operator that suddenly open the same process graphics in the workplace of the Experts)
- Now the Operator can show them the issue by pointing with the mouse pointer on the object in the screen and describe the issue (maybe even with temporary annotation and marks on the screen)
- Operator can even see the mouse pointers of the Experts in the screen and see what they are doing (e.g., opening pop ups or gathering more info)
- They may even be allowed to perform commands on operator's behalf (here we could foresee an "allow control button")
- Once Operator doesn't need the colleagues support, he can close the collaborative session The same concept can be extended to Engineering, exactly with the same principles, where more engineers can collaborate together to configure any control system aspect.

Example in Engineering Context:
- Two or more system engineers are accessing the same resource (control logic, process graphics, etc.)
- They may be working simultaneously (e.g., different areas of the same screen if creating process graphics) or collaboratively (e.g., reasoning together doing pair coding)

They may communicate with each other via IP calls (voice or even by embedding camera on the screen's side)

The consistency of the engineered data is ensured by the concurrency management of the state information handling server.

The information shared may vary for different collaborative scenarios but in general may be:

Mouse pointer position: mouse pointer position of an operators is constantly shared with the state information handling server to be always up to date in real-time on what the operator is doing (with an avatar, useful in case of multiple collaborators)

Mouse clicks: the action of the mouse may be represented (not only the position). Both left click and right click may be represented with some convention (e.g., some animation).

Remote audio: useful in case of remote support for audible alarms, for example an operator wants to share audibles with a remote support Voice: for example, if collaborators want to talk each other via "VOIP"

Text: for example, via a chat or annotation on objects. In this case they would leave some kind of virtual post-it on top of objects (e.g., graphic symbol representing a motor) so that other collaborators can visualize the message even if not real-time collaborating (only visible by designated operators).

Keyboard activities: if enabled, this feature will allow other collaborators to see what keyboard buttons are pressed by other colleagues (e.g., via some animations on a virtual keyboard). This might be useful to see which kind of setpoints or other inputs colleagues are sending to the control system (or engineering system)

Presence/availability: if a user is visualizing a certain HMI/Engineering content (e.g., a graphics page or an engineering drawing), his/her presence may be indicated with an avatar on the screen top. In this way other users can detect their presence in the same page (multiple avatars might be present at the same time if multiple users are watching at same content). Such information shall be useful to avoid collisions.

There might be situations where privacy of operators/engineers is particularly enforced, and their state information shall be shared only when strictly necessary and when requested by them explicitly. However, they may still be warned in case another operator is deemed to be interested in the same or a linked object.

When privacy is not an issue (under these terms), then state information (described above) may be constantly shared by the user terminals to the state information handling function of the state information handling server. However, the state information handling function of the state information handling server isn't sharing this information with anybody else until an actual collaboration session is started.

The state information handling function of the state information handling server can use the state information for local elaboration such as:

Avoid unexpected collision across different operators (that may not collaborate in that specific moment)

Compute statistics on potential collisions or collaboration, or how many times collaboration is used successfully and in which way The invention has a number of advantages. It can be seen that the user informing activity is performed based on the determination that two or more users are interested in the same object or in linked objects. Thereby the users do not have to send invitations to collaboration sessions and can also be warned before attempting to perform a possibly detrimental or forbidden activity.

As was mentioned earlier, the state information handling server may be provided in the form of a processor with associated program memory including computer program code for implementing the state information handling function.

Figure 9:
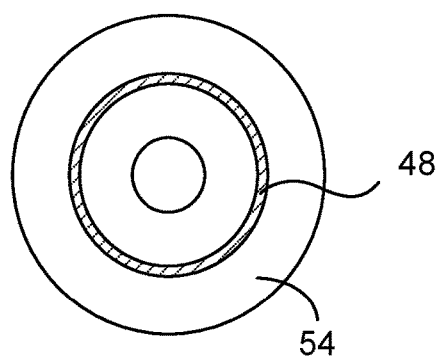
FIG. 9 shows a computer program product in the form of a CD ROM disc with a computer program performing the state information handling function of the state information handling server.

A computer program may also be a computer program product, for instance in the form of a computer readable storage medium or data carrier, like a CD ROM disc or a memory stick, carrying such a computer program with the computer program code, which will implement the above-described state information handling function when being loaded into a processor. One such computer program product in the form of a CD ROM disc 54 with the above-mentioned computer program code 46 is schematically shown in FIG. 9.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore, the invention is only to be limited by the following.

The invention claimed is:

1. A process control system comprising:
a plurality of user terminals, the user terminals being operable in a local mode where a user can only see the own user operations, and
a state information handling server, the state information handling server comprising a processor configured to:
obtain state information from the user terminals, the state information of at least two users including information about user operations in relation to objects in a process control screen,
inspect the state information with regard to objects in the process control screen, said inspecting is made when the user terminals are in the local mode and comprises determining, for each user, if the corresponding user targets an object in the process control screen, and
perform a user informing activity if objects in the process control screen that at least two users have targeted are same or are linked, wherein said processor being configured to perform the user informing activity includes:
said processor being configured to provide a warning to the user terminals of the at least two users in the local mode indicating that the targeted objects are same or are linked, and/or
said processor being configured to initiate a collaboration session in the user terminals of the at least two users, wherein the user terminals of the at least two users enter a collaboration mode where the at least two users are presented with user operations in a same screen.

2. The process control system according to claim 1, wherein the determining that a user targets an object includes determining that the user has selected, is about to select or is interested in the object in the process control screen.

3. The process control system according to claim 1, wherein the state information for at least one user includes information about movements of pointers in the process control screen.

4. The process control system according to claim 1, wherein the state information for at least one user includes an object that the user has selected in the process control screen.

5. The process control system according to claim 1, wherein the state information for at least one user includes user operations in another screen associated with an object of the process control screen.

6. The process control system according to claim 1, wherein at least one of the targeted objects represents a process control device.

7. The process control system according to claim 6, wherein the at least one targeted object represents a process influencing process control device.

8. The process control system according to claim 7, wherein the targeted objects are linked, where one of the targeted objects represents a process influencing process control device located upstream of a process control device represented by the other object.

9. A method for handling state information in a process control system, the process control system comprising a plurality of user terminals of users in the process control system and a state information handling server, the method comprising:
   operating, by the user terminals, in a local mode where a user can only see the own user operations,
   obtaining, by the state information handling server, state information from the user terminals, the state information of at least two users including information about user operations in relation to objects in a process control screen,
   inspecting, by the state information handling server, the state information with regard to objects in the process control screen, said inspecting is made when the user terminals are in the local mode and comprises determining, for each user, if the corresponding user targets an object in the process control screen, and
   performing, by the state information handling server, a user informing activity if objects in the process control screen that at least two users have targeted are same or are linked, wherein said performing the user informing activity includes:
      providing a warning to the user terminals of the at least two users in the local mode indicating that the targeted objects are same or are linked, and/or
      initiating a collaboration session in the user terminals of the at least two users, wherein the user terminals of the at least two users enter a collaboration mode where the at least two users are presented with user operations in a same screen.

10. A computer program product for handling state information in a process control system, the computer program product comprising non-transitory data storages with computer program instructions for execution by processors of user terminals, the user terminals being configured to operate in a local mode where a user can only see the own user operations, the computer program product further comprising a non-transitory data carrier with computer program code which when run in a processor of a state information handling server, causes the state information handling server to:
   obtain state information from the user terminals, the state information of at least two users including information about user operations in relation to objects in a process control screen,
   inspect the state information with regard to objects in the process control screen, said inspecting is made when the user terminals are in the local mode and comprises determining, for each user, if the corresponding user targets an object in the process control screen, and
   perform a user informing activity if objects in the process control screen that at least two users have targeted are same or are linked, wherein the user informing activity includes the state information handling server being caused to:
      provide a warning to the user terminals of the at least two users in the local mode indicating that the targeted objects are same or are linked, and/or
      initiate a collaboration session in the user terminals of the at least two users, wherein the user terminals of the at least two users enter a collaboration mode where the at least two users are presented with user operations in a same screen.

* * * * *